(12) United States Patent
Ye et al.

(10) Patent No.: US 7,643,289 B2
(45) Date of Patent: Jan. 5, 2010

(54) FRAME FOR MOUNTING DATA STORAGE DEVICE

(75) Inventors: Zhen-Xing Ye, Shenzhen (CN); Ke Sun, Shenzhen (CN); Ming-Ke Chen, Shenzhen (CN); Xiao-Zhu Chen, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 215 days.

(21) Appl. No.: 11/953,864

(22) Filed: Dec. 11, 2007

(65) Prior Publication Data

US 2008/0265125 A1 Oct. 30, 2008

(30) Foreign Application Priority Data

Apr. 26, 2007 (CN) .................... 2007 1 0200516

(51) Int. Cl.
*H05K 7/20* (2006.01)
(52) U.S. Cl. .................. 361/690; 361/685; 361/695; 361/727; 454/184
(58) Field of Classification Search ......... 361/690–697, 361/679.33, 679.47, 679.48, 679.46, 722–727, 361/816, 818, 831; 312/223.1, 223.111, 312/312.202, 312, 332.1, 204, 265.6; 454/184
See application file for complete search history.

(56) References Cited

U.S. PATENT DOCUMENTS

| | | | | | |
|---|---|---|---|---|---|
| 5,171,183 | A | * | 12/1992 | Pollard et al. | 454/184 |
| 5,511,055 | A | * | 4/1996 | Otsuki et al. | 720/649 |
| 6,061,236 | A | * | 5/2000 | Klein | 361/695 |
| 6,193,339 | B1 | * | 2/2001 | Behl et al. | 312/223.2 |
| 6,246,579 | B1 | * | 6/2001 | Lin | 361/695 |
| 6,628,518 | B2 | * | 9/2003 | Behl et al. | 361/679.47 |
| 6,636,422 | B1 | * | 10/2003 | Tanzer et al. | 361/679.46 |
| 6,826,046 | B1 | * | 11/2004 | Muncaster et al. | 361/679.33 |
| 7,164,579 | B2 | * | 1/2007 | Muncaster et al. | 361/679.33 |
| 7,206,201 | B2 | * | 4/2007 | Behl et al. | 361/679.48 |
| 7,307,843 | B2 | * | 12/2007 | Harman et al. | 361/719 |
| 7,447,011 | B2 | * | 11/2008 | Wade et al. | 361/679.33 |
| 2007/0041159 | A1 | * | 2/2007 | Bate | 361/697 |

* cited by examiner

*Primary Examiner*—Michael V Datskovskiy
(74) *Attorney, Agent, or Firm*—Frank R. Niranjan

(57) ABSTRACT

A frame for mounting a data storage device, includes a holder configured for mounting the data storage thereto, a baffle board mounted to the holder, and a V-shaped air guiding board mounted to the holder between the baffle board and the data storage device. An intake defined in the baffle board is configured to let airflow therethrough to cool the data storage device mounted to the frame. The opening of the "V" of the air guiding board faces the data storage device. Because of the V-shaped air guiding board, the frame efficiently dissipates heat from and around the data storage device.

4 Claims, 9 Drawing Sheets

FRAME FOR MOUNTING DATA STORAGE DEVICE

BACKGROUND

1. Field of the Invention

The present invention relates to frames for mounting data storage devices.

2. Description of Related Art

With advances in computer technology, computers have become needful tools in people's daily life and in business. Thus, a great amount of data storage space for storing information and good capability of information management are needed. In an industrial computer or a server, a plurality of stacked hard disk drives is used to obtain a greater amount of storage space as well as allowing different kinds of information to be stored in different hard disks for convenient information management. However, it is difficult to cool stacked hard disk drives efficiently.

Referring to FIGS. 1 to 3, typically, at least one frame 2 is mounted in a computer case. A hard disk drive 1 is secured to each frame 2 to be mounted in the computer case. The frame 2 includes a baffle board 4 mounted in the front thereof, and two arms 6 extending backward therefrom configured for securing the hard disk drive 1. An intake 8 is defined in the baffle board 4 configured to allow airflow therethrough to cool the hard disk drive 1. However, the airflow is at least partially blocked by a front end 9 of each hard disk drive 1 and air vortexes may be formed, so that flowing velocity of the airflow is weakened and the airflow does not efficiently pass the upper and lower surfaces of the hard disk drives 1, which is a great disadvantage for cooling the hard disk drives 1.

What is desired, therefore, is a frame for mounting a data storage device which facilitates dissipating heat from and around the data storage device.

SUMMARY

An exemplary frame, for mounting a data storage device, includes a holder configured for mounting the data storage thereto, a baffle board mounted to the holder, and a V-shaped air guiding board mounted to the holder between the baffle board and the data storage device. An intake is defined in the baffle board configured to let airflow therethrough to cool the data storage device mounted to the frame. The opening of the "V" of the air guiding board faces the data storage device.

Other advantages and novel features will become more apparent from the following detailed description when taken in conjunction with the accompanying drawings, in which:

DETAILED DESCRIPTION

Figure 1:
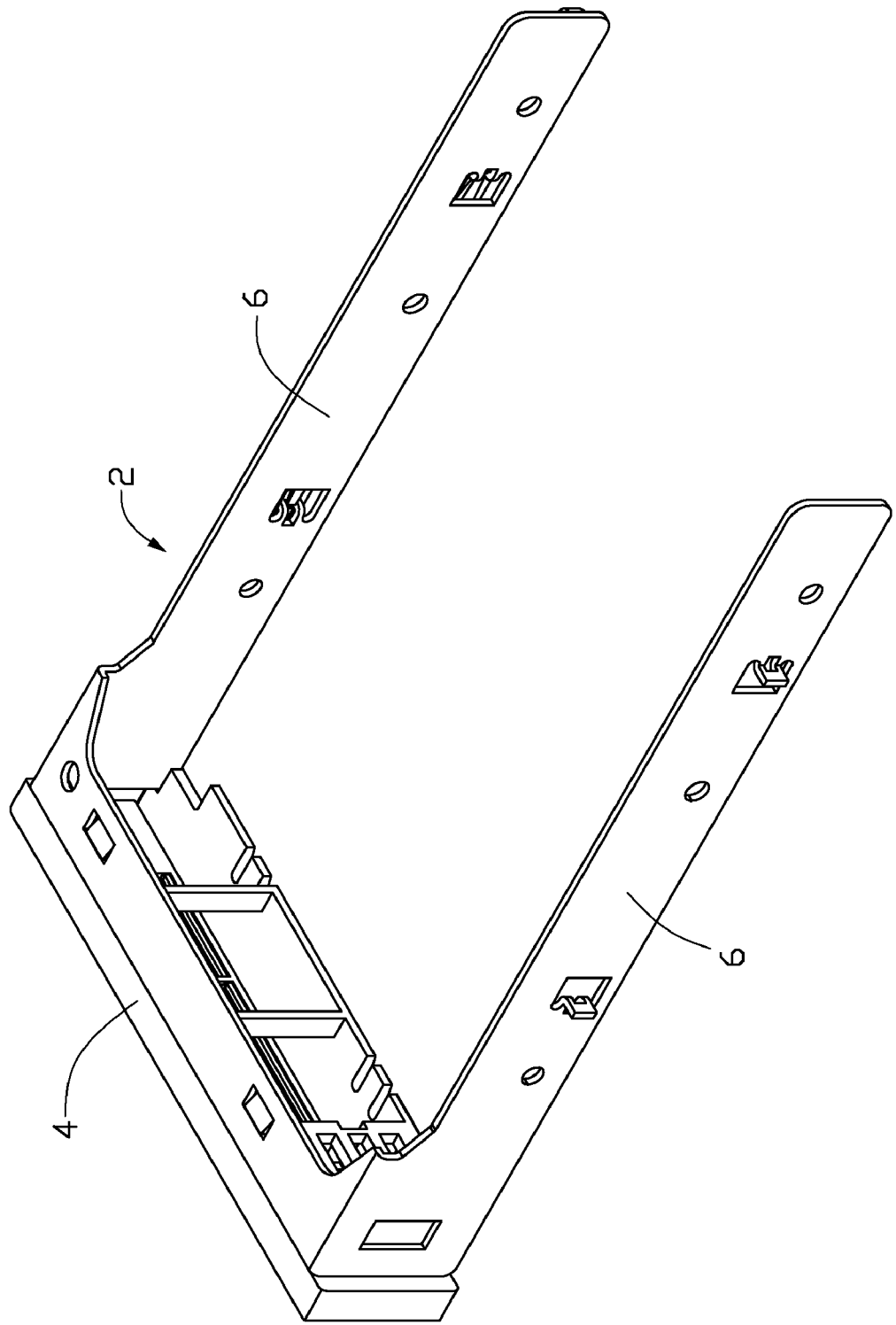
FIG. 1 is an isometric view of a typical frame for mounting a data storage device.
Figure 2:
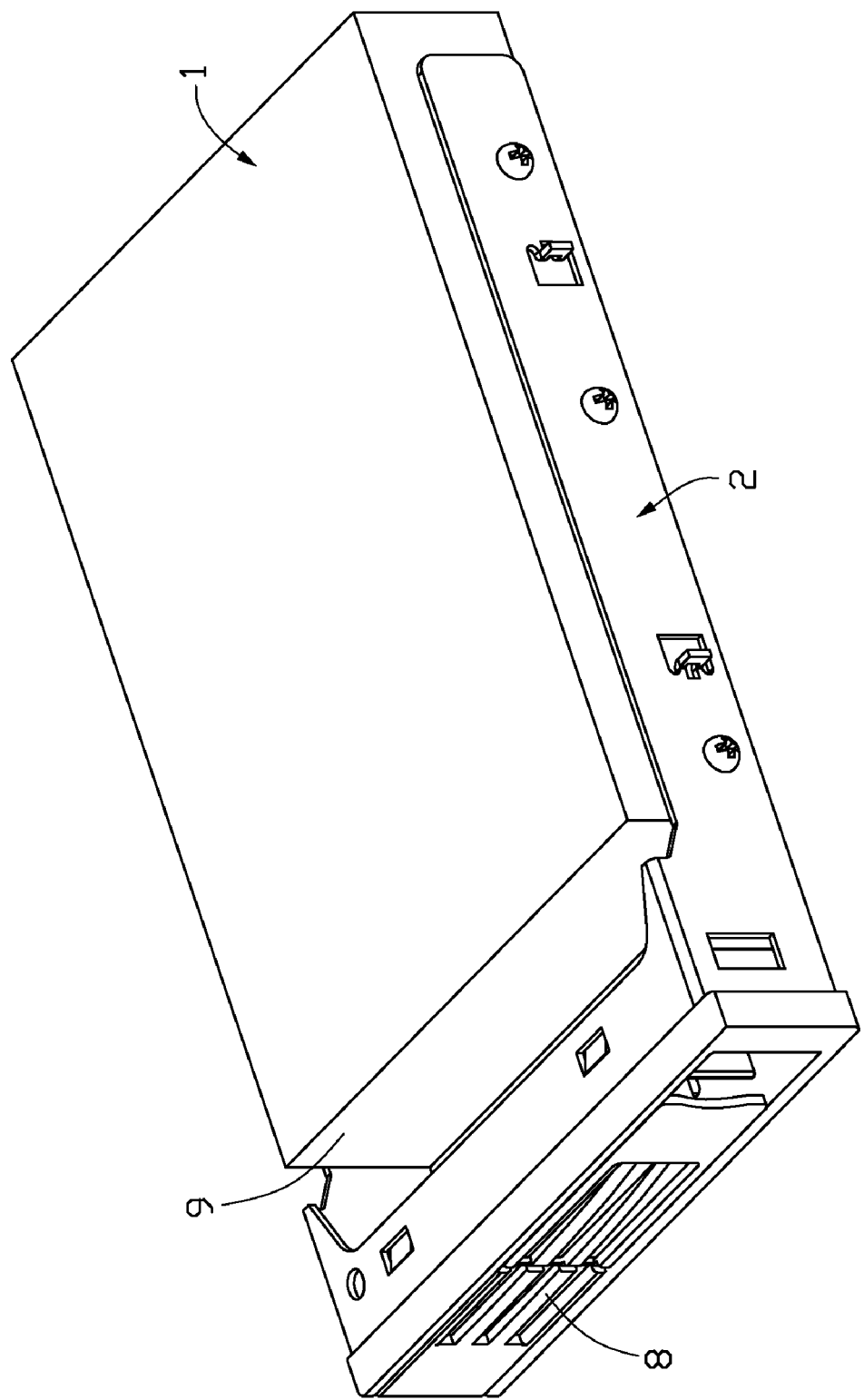
FIG. 2 is an assembled, isometric view of an assembly of the frame in FIG. 1 and a data storage driver.
Figure 3:
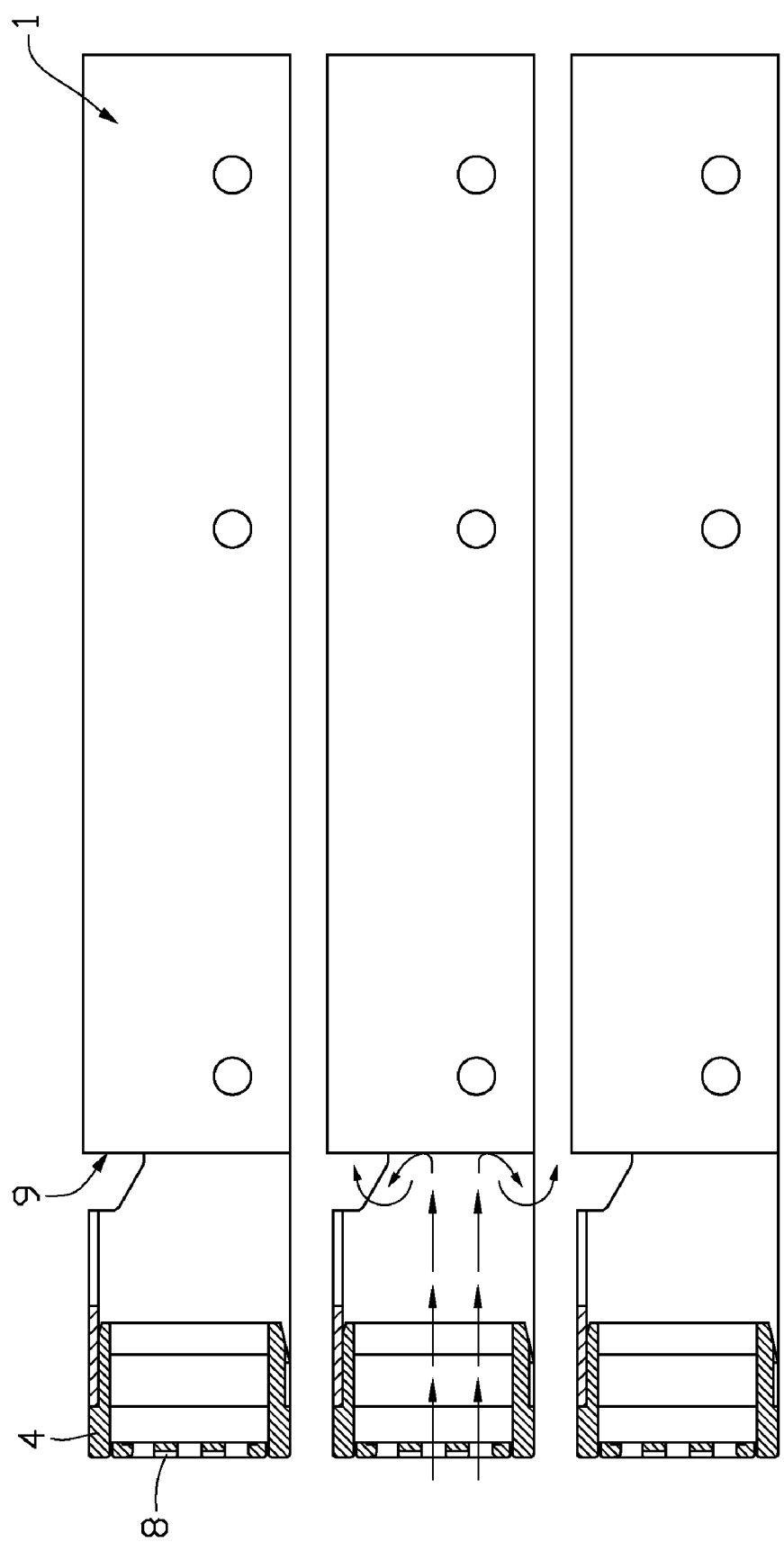
FIG. 3 is a side, elevational view of a plurality of stacked assemblies in FIG. 2.
Figure 4:
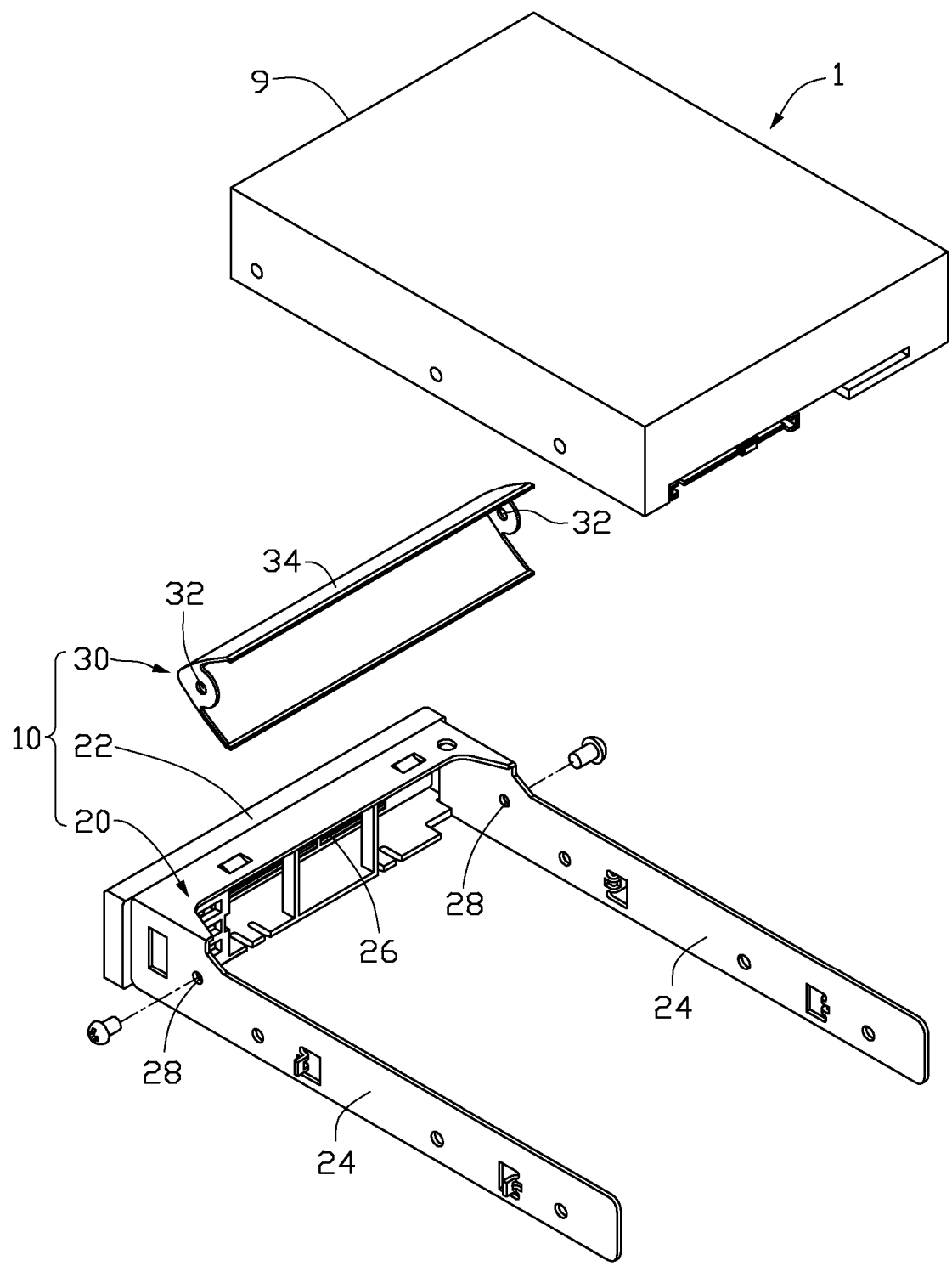
FIG. 4 is an exploded, isometric view of a frame for mounting a data storage in accordance with a first embodiment of the present invention together with a hard disk drive, the frame includes an air guide.
Figure 5:
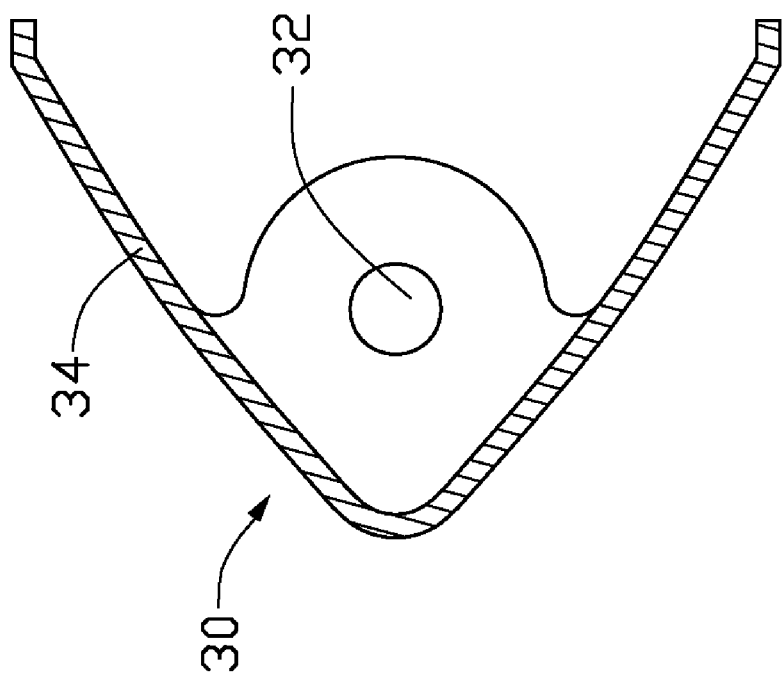
FIG. 5 is a cut-away, side, elevational view of the air guide in FIG. 4.
Figure 6:
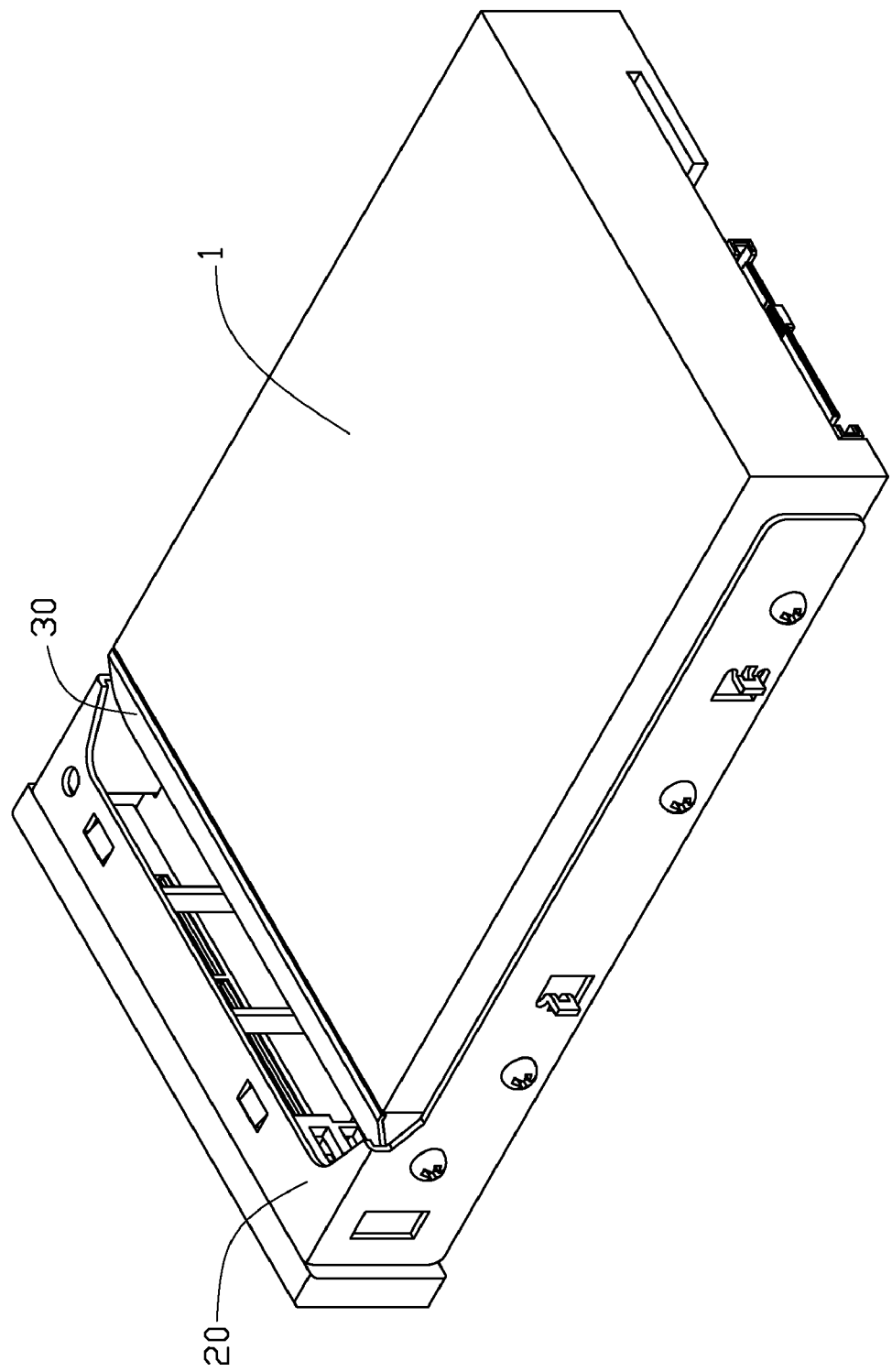
FIG. 6 is an assembled, isometric view of an assembly of FIG. 4.

Referring to FIGS. 4 to 6, a frame 10 for mounting a data storage device in accordance with a first embodiment of the present invention includes a holder 20, a baffle board 22, and an air guide 30. The data storage device is a hard disk device 1 in the embodiment. A plurality of assembly holes is defined in opposite sides of the hard disk device 1.

The holder 20 has generally the same width as the hard disk device 1 and includes two arms 24 perpendicularly extending from opposite ends thereof respectively and parallel to each other. A plurality of assembly holes is defined in each arm 24 corresponding to the assembly holes of the hard disk device 1. The hard disk device 1 is secured between the two arms 24 via a plurality of screws engaging in the assembly holes of the arms 24 and the hard disk device 1. The baffle board 22 is perpendicular to both the holder 20 and the arms 24 and is connected to edges of the arms 24 adjacent the holder 20. An assembly hole 28 is defined in each arm 24 near the baffle board 22.

An intake 26 is defined in the baffle board 22 configured to let airflow therethrough to cool the hard disk drive 1 mounted to the frame 10.

The air guide 30 includes a V-shaped air guiding board 34 and two connecting pieces respectively formed at opposite ends of the air guiding board 34. An assembly hole 32 is defined in each connecting piece corresponding to the assembly holes 28 of arms 24. A screw is inserted through the assembly hole 28 of each arm 24 and engaged in the corresponding assembly hole 32 of the air guiding board 34, so that the air guiding board 34 is secured to the frame 10 between the baffle board 22 and the hard disk device 1. Each leg of the "V" of the air guiding board 34 is convex (see FIG. 5) and extends towards the hard disk drive 1, and the air guiding board 34 is closely fit the front end of the hard disk device 1.

Figure 7:
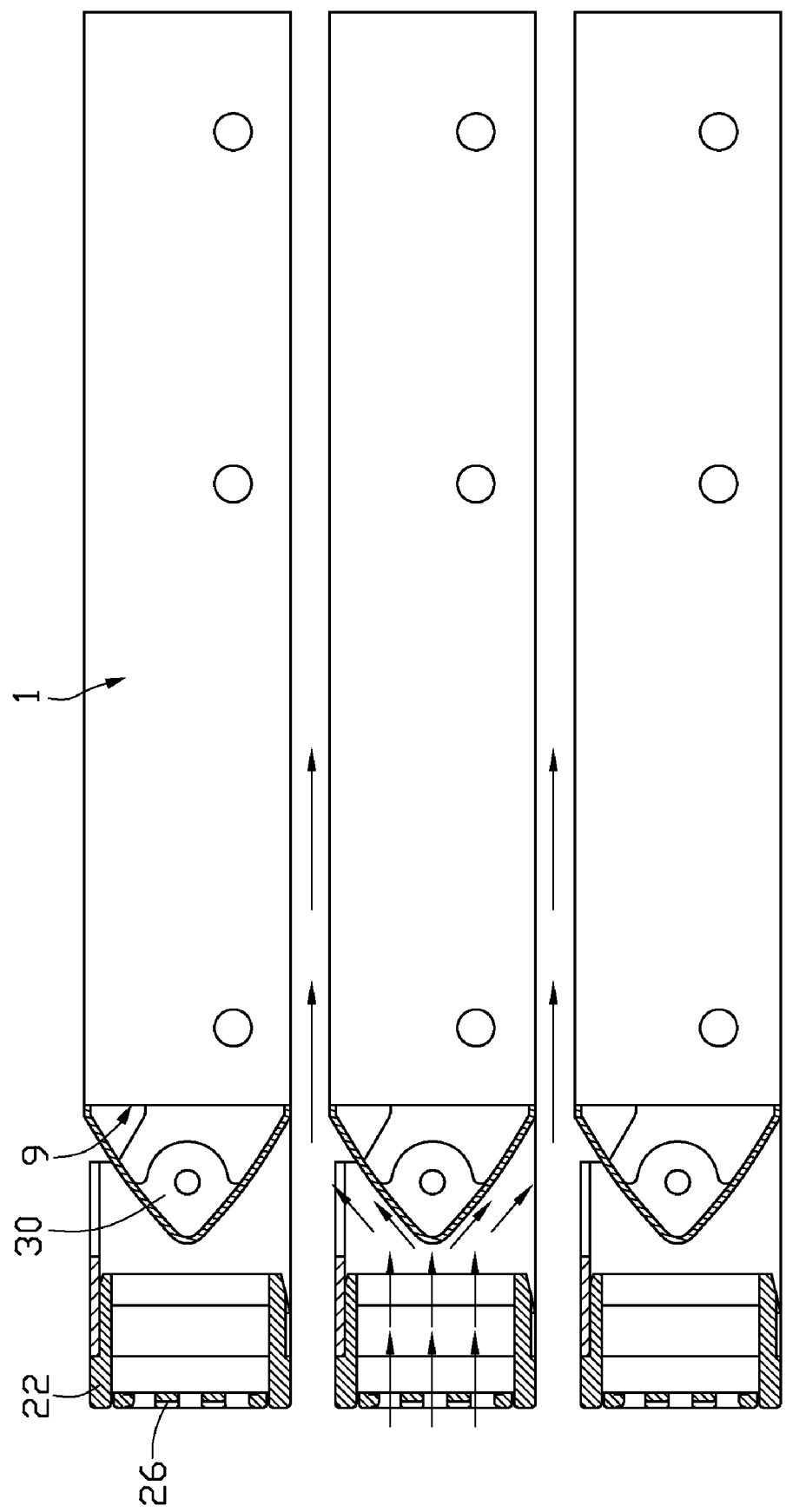
FIG. 7 is a partial cut-away, side, elevational view of a plurality of stacked assemblies in FIG. 6.

Referring to FIG. 7, in use, the hard disk device 1 is mounted to the frame 10 to form an assembly. A plurality of the assemblies is stacked one by one in a computer case. Air flows through the intake 26 of each frame 10 and into the assemblies. Because of the air guide 30 in each frame 10, the airflow is guided along the air guiding board 34 of each air guide 30. Thus, no air vortexes will be formed and the airflow can efficiently pass over upper and lower surfaces of each hard disk drive 1 to cool the hard disk drives 1.

Figure 8:
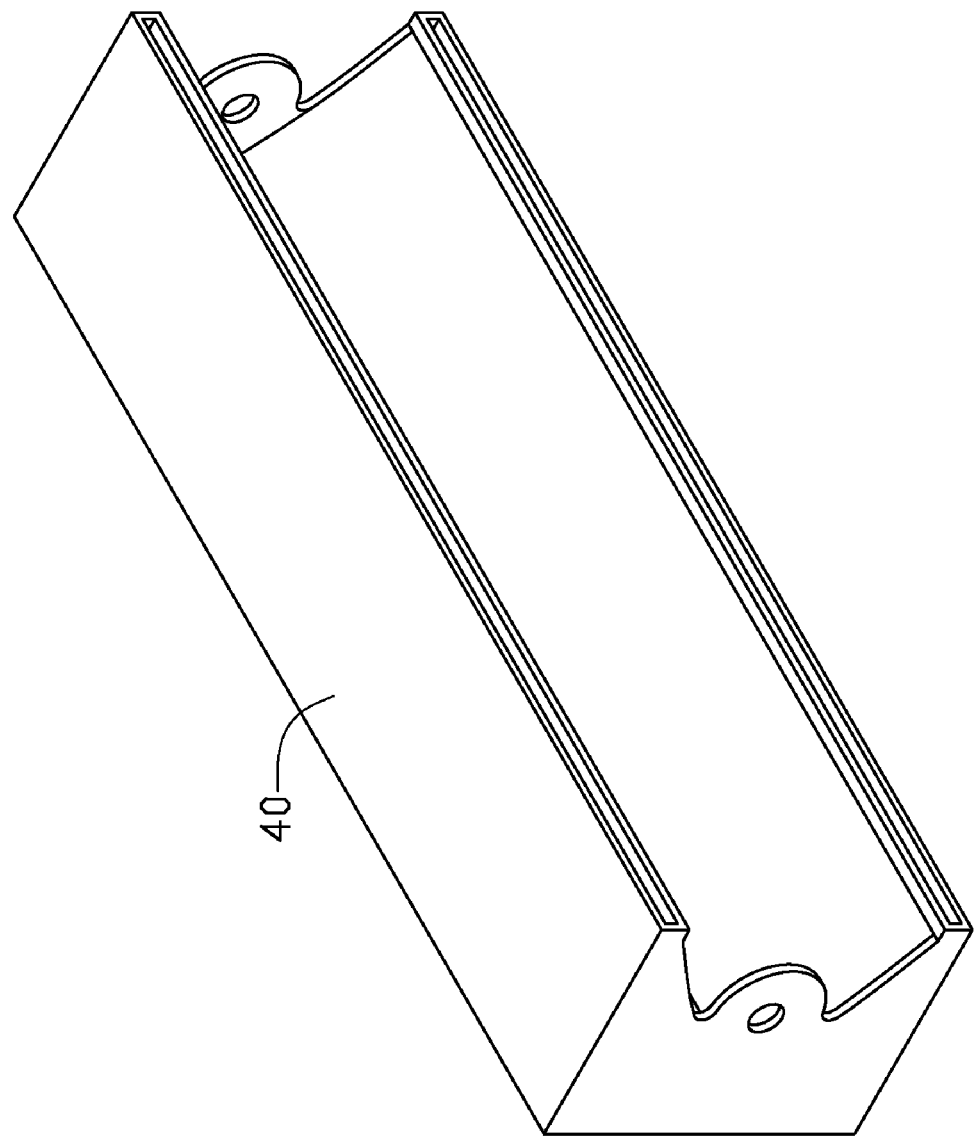
FIG. 8 is an isometric view of an air guide in accordance with a second embodiment of the present invention.
Figure 9:
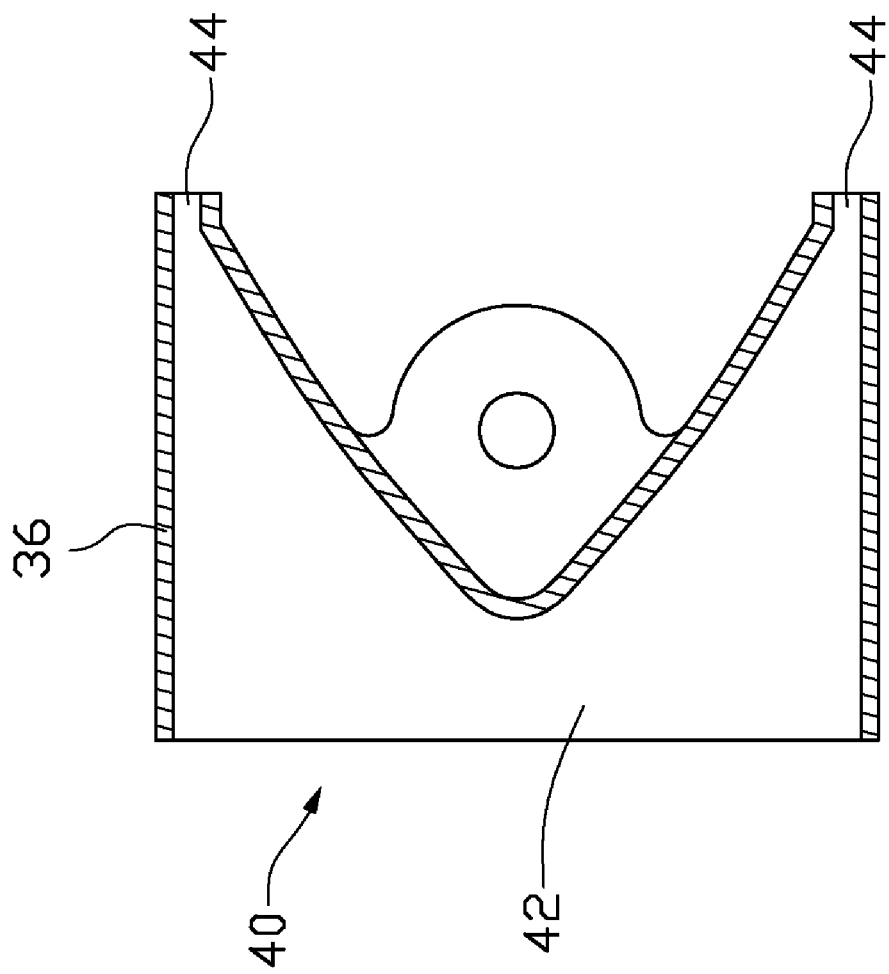
FIG. 9 is a cut-away, side, elevational view of FIG. 8.

Referring to FIGS. 8 and 9, an air guide 40 in accordance with a second embodiment of the present invention is shown. Comparing with the air guide 30 in the first embodiment, a cover 36 is added to the air guide 40 configured for forming a broad entrance 42 near the baffle board 22 and two narrow exits 44 near the hard disk drives 1.

It is believed that the present embodiments and their advantages are understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A frame for mounting a data storage device, comprising:
   a holder configured for mounting the data storage thereto;
   a baffle board mounted to the holder, an intake being defined in the baffle board configured to let airflow therethrough to cool the data storage device mounted to the frame; and
   a V-shaped air guiding board mounted to the holder between the baffle board and the data storage device, legs of the "V" of the air guiding board extend toward the data storage device.

2. The frame as claimed in claim 1, wherein each of the legs of the "V" of the air guiding board is convex.

3. The frame as claimed in claim 1, wherein a cover is secured to the air guiding board, the cover and the air guiding board cooperate to form a broad airflow entrance near the baffle board and two narrow airflow exits near the data storage device.

4. The frame as claimed in claim 1, wherein the data storage device is a hard disk drive.

* * * * *